(12) United States Patent
Sebire

(10) Patent No.: US 10,667,241 B2
(45) Date of Patent: May 26, 2020

(54) SIGNALLING REPORT TRANSMISSION IN CARRIER AGGREGATION

(75) Inventor: Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 35 days.

(21) Appl. No.: 13/640,055

(22) PCT Filed: Apr. 9, 2010

(86) PCT No.: PCT/EP2010/054699
§ 371 (c)(1),
(2), (4) Date: Jan. 3, 2013

(87) PCT Pub. No.: WO2011/124263
PCT Pub. Date: Oct. 13, 2011

(65) Prior Publication Data
US 2013/0128829 A1    May 23, 2013

(51) Int. Cl.
*H04W 72/04* (2009.01)
*H04W 72/12* (2009.01)
*H04L 5/00* (2006.01)
*H04W 52/36* (2009.01)

(52) U.S. Cl.
CPC .............. *H04W 72/04* (2013.01); *H04L 5/001* (2013.01); *H04L 5/0098* (2013.01); *H04W 72/1284* (2013.01); *H04W 52/365* (2013.01)

(58) Field of Classification Search
CPC ................................................. H04W 72/0413
See application file for complete search history.

(56) References Cited

U.S. PATENT DOCUMENTS

| | | | |
|---|---|---|---|
| 2004/0233898 A1 | 11/2004 | Otsuka et al. | |
| 2006/0251105 A1 | 11/2006 | Kim et al. | |
| 2007/0053343 A1 | 3/2007 | Suotula et al. | |
| 2008/0117870 A1 | 5/2008 | Hurtta | |
| 2008/0248804 A1 | 10/2008 | Al-Bakri et al. | |
| 2009/0046642 A1* | 2/2009 | Damnjanovic | H04L 47/24 370/329 |
| 2009/0088195 A1* | 4/2009 | Rosa | H04W 72/1284 455/507 |

(Continued)

FOREIGN PATENT DOCUMENTS

CN    101300857 A    5/2008
JP    2013/511916 A    4/2013

(Continued)

OTHER PUBLICATIONS

3GPP TS 36.321 V9.1.0; "3rd Generation Partnership Project; Technical Specification Group Radio Access Network; Evolved Universal Terrestrial Radio Access (E-UTRA) Medium Access Control (MAC) protocol specification (Release 9)"; Dec. 2009; whole document (48 pages).

(Continued)

*Primary Examiner* — Kevin M Cunningham
(74) *Attorney, Agent, or Firm* — Harrington & Smith

(57) ABSTRACT

A user equipment prepares a signalling report in response to receiving a control element for activation/deactivation of component carriers to be used by the user equipment for communication in a cellular communications network system, and transmits the signalling report.

15 Claims, 2 Drawing Sheets

(56) References Cited

U.S. PATENT DOCUMENTS

| | | | |
|---|---|---|---|
| 2009/0303954 A1* | 12/2009 | Guo | H04L 47/14 370/329 |
| 2010/0111023 A1* | 5/2010 | Pelletier | H04L 5/0007 370/329 |
| 2010/0118720 A1* | 5/2010 | Gauvreau | H04W 72/048 370/252 |
| 2010/0130219 A1* | 5/2010 | Cave | H04W 72/02 455/450 |
| 2010/0232385 A1* | 9/2010 | Hsu | 370/329 |
| 2010/0302964 A1* | 12/2010 | Guo | 370/252 |
| 2011/0096815 A1* | 4/2011 | Shin | H04B 7/0689 375/219 |
| 2011/0134774 A1* | 6/2011 | Pelletier et al. | 370/252 |
| 2011/0170418 A1* | 7/2011 | Sagfors | H04W 36/0083 370/241 |
| 2011/0205976 A1* | 8/2011 | Roessel | H04L 5/001 370/329 |
| 2011/0305290 A1* | 12/2011 | Kim | H04L 5/0007 375/267 |

FOREIGN PATENT DOCUMENTS

| | | |
|---|---|---|
| JP | 2013/528005 A | 7/2013 |
| RU | 2007130081 A | 2/2009 |
| WO | WO 2009/086188 A2 | 7/2009 |
| WO | WO 2009/118367 A2 | 10/2009 |
| WO | WO 2011/098236 A1 | 8/2011 |

OTHER PUBLICATIONS

3GPP TS 36.321 V8.8.0 (Dec. 2009), "$3^{rd}$ Generation Partnership Project; Technical Specification Group Radio Access Network; Evolved Universal Terrestrial Radio Access (E-UTRA) Medium Access Control (MAC) protocol specification (Release 8)", 44 pgs.

R2-093152, 3GPP TSG RAN WG2 Meeting #66, San Francisco, USA, May 4-8, 2009, "Considerations on SI for DC-HSUPA", Huawei, 3 pgs.

R2-101119, 3GPP TSG RAN WG2 Meeting #69, San Francisco, USA, Feb. 22-26, 2010, "DL carrier activiation/deactivitation by MAC", ETRI, 4 pgs.

R2-101391; 3GPP TSG-RAN WG2#69; Motorola; "Linking of downlink CC to uplink CC"; Feb. 22-26, 2010, San Francisco, USA (4 pages).

\* cited by examiner

SIGNALLING REPORT TRANSMISSION IN CARRIER AGGREGATION

The present invention relates to a signalling report transmission in carrier aggregation. In particular, the present invention relates to a buffer status and power headroom reports transmission in carrier aggregation.

Among signalling reports standardized in Release 8 of E-UTRAN (evolved universal terrestrial radio access network) to support uplink packet scheduling and link adaptation are a buffer status report (BSR) and a power headroom report (PHR). BSR is used to inform an eNB (evolved node B) of an amount of data available for transmission in a UE (user equipment) buffer. A PHR brings information on how close the UE is operating to its maximum transmission power capabilities, and is therefore important for the eNB to be able to estimate an experienced SINR (signal to interference-plus-noise ratio) when the UE is allocated a certain transmission bandwidth. A BSR is typically used by the eNB to choose an appropriate transport block size while a PHR is typically used to select an appropriate modulation and coding scheme (MCS).

Release 10 of E-UTRAN introduces carrier aggregation (CA), where two or more component carriers (CCs) are aggregated in order to support wider transmission bandwidths up to 100 MHz and for spectrum aggregation. In CA, it is possible to configure a UE to aggregate a different number of CCs originating from the same eNB and of possibly different bandwidths in UL (uplink) and DL (downlink). The principle of carrier aggregation is illustrated in FIG. 1 which shows an LTE (long term evolution) advanced system bandwidth comprising 5×20 MHz component carriers. 3GPP (third generation partnership project) Release 8 UEs are assumed to be served by a stand-alone CC, while Release 10 terminals can be configured to receive or transmit simultaneously on multiple aggregated CCs in the same TTI (transmission time interval).

In CA, component carriers that are configured for a UE can be activated/deactivated dynamically by means of a MAC (medium access control) control element. For an eNB to obtain an updated knowledge of buffer status and power headroom of the UE when activation/deactivation of CCs takes place, the eNB has to force an RRC (radio resource control) connection reconfiguration of PHR reporting. The reconfiguration of the PHR reporting is a straightforward trigger for PHR but also an indirect one for BSR as it triggers an RRC response in uplink, which is considered as high priority data arrival and therefore triggers a BSR.

That is, a BSR is triggered upon 1) arrival of high priority data, 2) periodic reporting, or 3) occurrence of padding large enough to accommodate a BSR. A PHR is triggered upon 1) path loss change, 2) periodic reporting or 3) reconfiguration of the reporting.

The present invention aims at immediately providing an eNB with updated knowledge of buffer status and power headroom of a UE when activation/deactivation of CCs takes place.

This is achieved by an apparatus, method and computer program product as defined in the appended claims.

According to an embodiment of the invention, a user equipment prepares a signalling report in response to receiving a control element for activation/deactivation of component carriers to be used by the user equipment for communication in a cellular communications network system, and transmits the signalling report.

Thus, an eNB can be provided with signalling reports from a UE when activation/deactivation of CCs takes place without having to perform an RRC connection reconfiguration.

In the following the invention will be described by way of embodiments thereof with reference to the accompanying drawings, in which.

Figure 1:
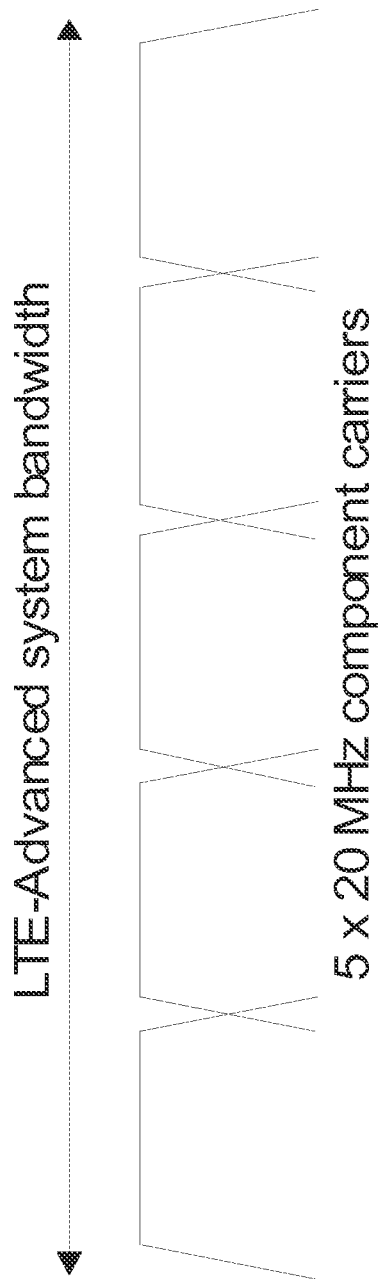
FIG. 1 shows a basic illustration of component carriers to form LTE-Advanced system bandwidth.
Figure 2:
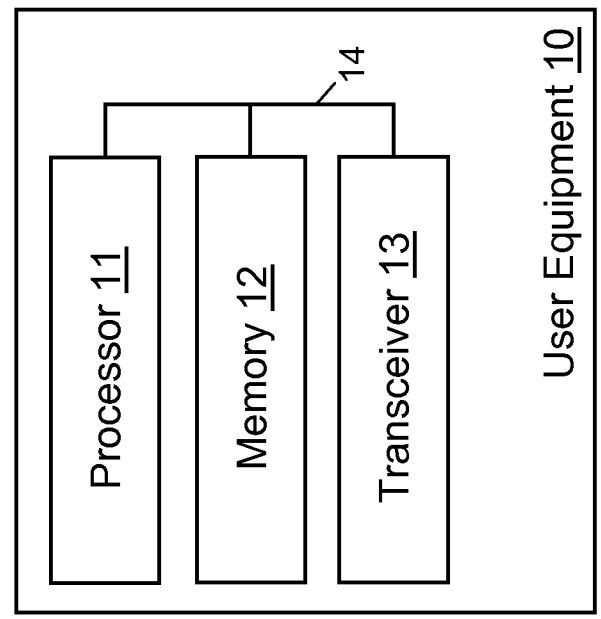
FIG. 2 shows a schematic block diagram illustrating a structure of a UE according to an embodiment of the invention.

Referring to FIG. 2, a user equipment (UE) 10 comprises a processor 11, a memory 12 and a transceiver 13 which are connected via a bus 14. The UE 10 may be compliant with Release 10 of E-UTRAN.

The memory 12 may store a program, and the transceiver 13 may be a suitable radio frequency (RF) transceiver coupled to one or more antennas (not shown) for bidirectional wireless communications over one or more wireless links with an eNB.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored in the memory 12 may include program instructions that, when executed by the processor 11, enable the UE 10 to operate in accordance with the exemplary embodiments of this invention, as detailed below. Inherent in the processor 11 is a clock to enable synchronism among the various apparatus for transmissions and receptions within the appropriate time intervals and slots required, as the scheduling grants and the granted resources/subframes are time dependent. The transceiver 13 includes both transmitter and receiver, and inherent in each is a modulator/demodulator commonly known as a modem.

In general, the exemplary embodiments of this invention may be implemented by computer software stored in the memory 12 and executable by the processor 11 of the UE 10, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory 12 may be of any type suitable to the local technical environment and may be implemented using any suitable data storage technology, such as semiconductor-based memory devices, magnetic memory devices and systems, optical memory devices and systems, fixed memory and removable memory. The processor 11 may be of any type suitable to the local technical environment, and may include one or more of general purpose computers, special purpose computers, microprocessors, digital signal processors (DSPs) and processors based on a multi-core processor architecture, as non-limiting examples.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

According to an embodiment of the invention, the processor 11 of the UE 10 prepares a signalling report in response to receiving a control element for activation/deactivation of component carriers to be used by the UE 10 for communication in a cellular communications network system, and the transceiver 13 transmits the signalling report. The UE 10 may receive the control element for activation/de-activation via the transceiver 13 from an E-UTRAN, e.g. from an eNB of the E-UTRAN with which the UE 10 communicates currently. The transceiver 13 may transmit the signalling report to an eNB with which the UE 10 communicates currently.

The signalling report transmitted by the transceiver 13 may support uplink packet scheduling and link adaptation for the UE 10. The signalling report may include a buffer status report and/or a power headroom report.

The control element for activation/deactivation may be a medium access control element and may comply with a MAC protocol. The transceiver 13 may transmit the signalling report via a medium access control element complying with the MAC protocol.

The control element for activation/deactivation may be a control element for activation of component carriers and/or a control element for deactivation of component carriers. The component carriers may comprise at least one of component carriers configured to be used by the UE 10.

Thus, according to an embodiment of the invention, a new trigger is introduced for PHR and BSR: activation/deactivation of CC. Since activation/deactivation of CC is performed by a MAC control element, the new trigger can also be described as reception of a MAC control element for activation/deactivation. The trigger may be restricted to activation only and therefore exclude de-activation. It is also possible to restrict the trigger further to a subset of configured CCs. Such restrictions may be different for BSR and PHR. For instance, a PHR may be triggered upon activation and deactivation of any CC, i.e. upon reception of a MAC control element for activation/deactivation, while a BSR may be triggered upon activation only.

Figure 3:
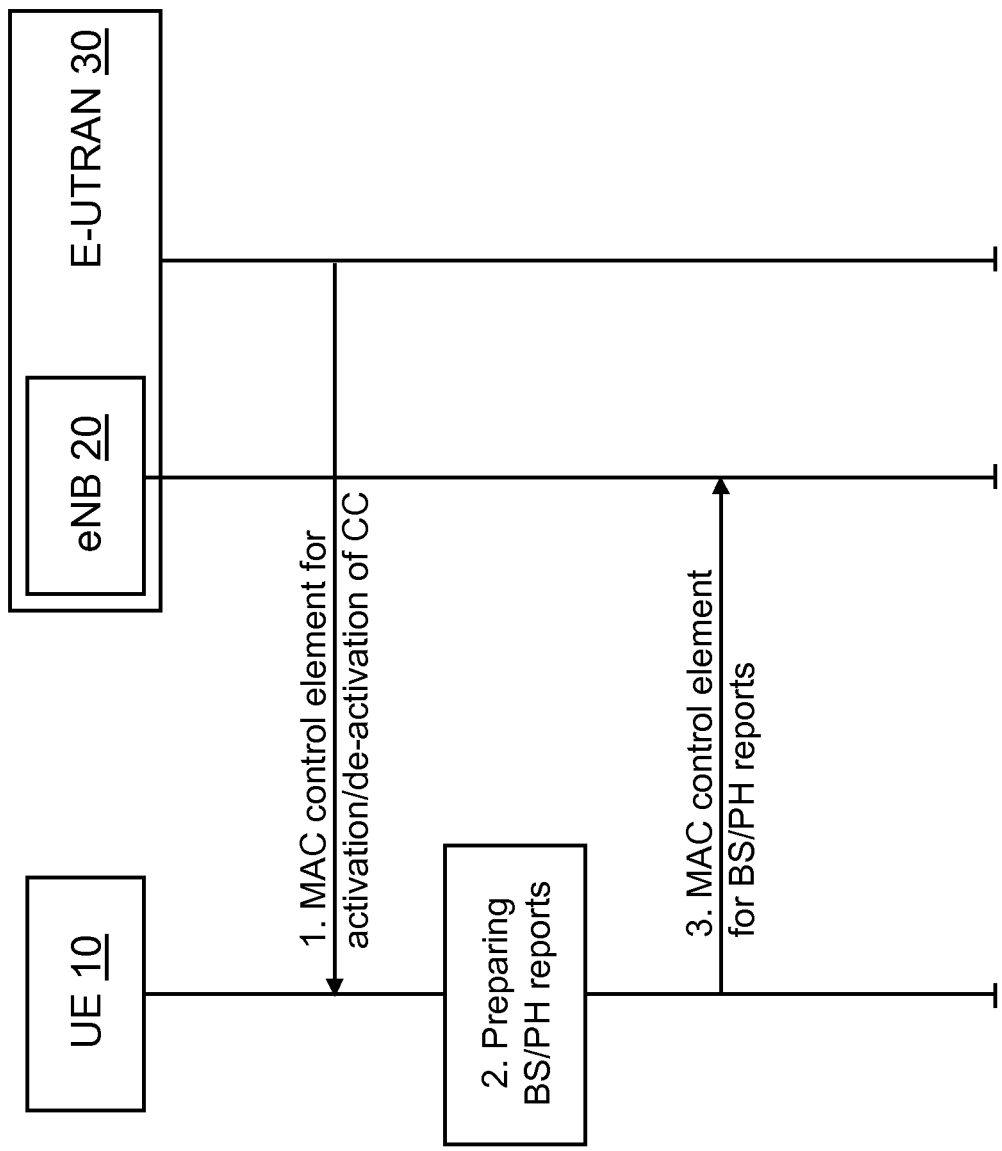
FIG. 3 shows a signalling diagram illustrating signalling between a UE, an eNB and an E-UTRAN according to an embodiment of the invention.

FIG. 3 shows a signalling diagram illustrating signalling between the UE 10, an eNB 20 and an E-UTRAN 30 according to an embodiment of the invention.

In a step 1 the UE 10 receives a control element for activation/deactivation of component carriers to be used by the UE 10 for communication in a cellular communications network system. According to the embodiment shown in FIG. 3, the cellular communications system comprises the E-UTRAN 30. The UE 10 may receive the control element for activation/deactivation from the E-UTRAN 30, e.g. the eNB 20 with which the UE 10 currently communicates. According to the embodiment shown in FIG. 3, the control element for activation/deactivation is a medium access control element.

Upon receiving the control element, in a step 2 the UE 10 prepares a signalling report. The signalling report may support uplink packet scheduling and link adaptation for the UE 10 by the eNB 20. According to the embodiment shown in FIG. 3, the signalling report includes BS/PH reports.

In a step 3, the UE 10 transmits the BS/PH reports to the eNB 20. According to the embodiment shown in FIG. 3, the BS/PH reports are transmitted via a medium access control element.

As mentioned above, the control element for activation/deactivation may comprise a control element for activation of component carriers and/or a control element for deactivation of component carriers, and the component carriers may comprise at least one of component carriers configured to be used by the UE 10. There may be different triggers for BSR and PHR, e.g. a PHR may be prepared and transmitted by the UE 10 upon receiving a MAC control element for activation and/or deactivation of any CC, while the UE 10 prepares and transmits a BSR upon receiving a MAC control element for activation only. The trigger may further be restricted to a subset of configured CCs.

According to an aspect of the present invention, an apparatus such as the UE 10 comprises preparing means for preparing a signalling report in response to receiving a control element for activation/deactivation of component carriers to be used by the apparatus for communication in a cellular communications network system, and transmitting means for transmitting the signalling report. The preparing means may comprise the processor 11, and the transmitting means may comprise the transceiver 13.

The signalling report may support uplink packet scheduling and link adaptation for the apparatus and/or include a buffer status report and/or a power headroom report.

The control element for activation/deactivation may be a medium access control element and/or the transmitting means may transmit the signalling report via a medium access control element.

The control element for activation/deactivation may comprise at least one of the following group: a control element for activation of component carriers and a control element for deactivation of component carriers, and the component carriers may comprise at least one of component carriers configured to be used by the apparatus.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
    receiving a control element for activation/deactivation of
        component carriers to be used by a user equipment for communication in a cellular communications network system, wherein activation/deactivation of the component carriers takes place without performing a radio resource control connection reconfiguration;

determining whether to prepare and transmit a signaling report and a power headroom report based on an assigned plurality of restrictions, wherein the plurality of restrictions are based on either or both of: the control element indicating whether certain component carriers are activated or deactivated, or a subset of the component carriers indicated as being configured by the control element;

in response to and upon the receiving of the control element, preparing the signaling report, or the power headroom report, or both depending on the assigned plurality of restrictions;

wherein the power headroom report is generated, based on each of the component carriers, to indicate a power headroom of the user equipment to provide information on how close the user equipment is operating to its maximum transmission power capabilities;

wherein the power headroom report is prepared and transmitted without consideration of path loss change, periodic reporting, and reconfiguration of power headroom reporting;

transmitting the signaling report, or the power headroom report, or both to a radio node to be used by the radio node following the preparation of the one or more reports;

wherein the signaling report and/or the power headroom report are configured to provide information to the radio node to enable the radio node to determine a transport block size, and/or select a modulation and coding scheme;

activating or deactivating at least one of the component carriers used by the user equipment with the control element; and aggregating two or more of the activated component carriers in uplink and downlink in a common transmission time interval.

2. The method of claim 1, wherein the signaling report and the power headroom report support uplink packet scheduling and link adaptation for the apparatus.

3. The method of claim 1, wherein at least one:
the control element for activation/deactivation is a medium access control element; and
the transmitting comprises transmitting the signaling report, the power headroom report, or both via a medium access control element.

4. The method of claim 1,
wherein the control element for activation/deactivation comprises at least one of the following group: a control element for activation of component carriers and a control element for deactivation of component carriers, and
wherein the component carriers comprise at least one of component carriers configured to be used by the apparatus.

5. The method of claim 1, wherein the signaling report is a buffer status report that is prepared and transmitted without consideration of arrival of high priority data, periodic reporting, and occurrence of padding large enough to accommodate the signaling report.

6. The method of claim 5, wherein the buffer status report is generated, based on each of the component carriers, to inform a radio node of an amount of data available for transmission in buffer of the user equipment.

7. The method of claim 1, wherein the preparation and transmission of the signaling report, or the power headroom report, or both is restricted to the control element indicating activation of any of the component carriers, and excludes deactivation.

8. The method of claim 1, wherein the preparation and transmission of the signaling report, or the power headroom report, or both is restricted to a subset of configured component carriers.

9. A computer program product embodied on a non-transitory computer-readable medium in which a computer program is stored that, when being executed by a computer, is configured to provide instructions to control or carry out the method of claim 1.

10. The method of claim 1, comprising restrictions for transmission of the signaling report and/or the power headroom report according to the control element based on one or more of 1) whether the at least one of the component carriers are activated or deactivated, 2) a subset of the component carriers, and 3) the type of report transmitted.

11. An apparatus, comprising:
at least one processor and at least one memory including computer program code, wherein the at least one memory and the computer code are configured, with the at least one processor, to cause the apparatus to at least perform the following:

receiving a control element for activation/deactivation of component carriers to be used by the apparatus for communication in a cellular communications network system, wherein activation/deactivation of the component carriers takes place without performing a radio resource control connection reconfiguration;

determining whether to prepare and transmit a signaling report and a power headroom report based on an assigned plurality of restrictions, wherein the plurality of restrictions are based on either or both of: the control element indicating whether certain component carriers are activated or deactivated, or a subset of the component carriers indicated as being configured by the control element;

in response to and upon the receiving of the control element, preparing the signaling report, or the power headroom report, or both depending on the assigned plurality of restrictions;

wherein the power headroom report is generated, based on each of the component carriers, to indicate a power headroom of the user equipment to provide information on how close the user equipment is operating to its maximum transmission power capabilities;

wherein the power headroom report is prepared and transmitted without consideration of path loss change, periodic reporting, and reconfiguration of power headroom reporting;

transmitting the signaling report, or the power headroom report, or both to a radio node to be used by the radio node following the preparation of the one or more reports;

wherein the signaling report and/or the power headroom report are configured to provide information to the radio node to enable the radio node to determine a transport block size, and/or select a modulation and coding scheme;

activating or deactivating at least one of the component carriers used by the user equipment with the control element; and aggregating two or more of the activated component carriers in uplink and downlink in a common transmission time interval.

12. The apparatus of claim 11, wherein the signaling report and the power headroom report support uplink packet scheduling and link adaptation for the apparatus.

13. The apparatus of claim 11, wherein at least one:
the control element for activation/deactivation is a medium access control element; and
the transmitting comprises transmitting the signaling report, the power headroom report, or both via a medium access control element.

14. The apparatus of claim 11,
wherein the control element for activation/deactivation comprises at least one of the following group: a control element for activation of component carriers and a control element for deactivation of component carriers, and
wherein the component carriers comprise at least one of component carriers configured to be used by the apparatus.

15. A method, comprising:
receiving a control element for activation/deactivation of component carriers to be used by a user equipment for communication in a cellular communications network system, wherein activation/deactivation of the component carriers takes place without performing a radio resource control connection reconfiguration;
determining whether to prepare and transmit a buffer status report based on an assigned plurality of restrictions, wherein the plurality of restrictions are based on either or both of: the control element indicating whether certain component carriers are activated or deactivated, or a subset of the component carriers indicated as being configured by the control element;
in response to and upon receiving of the control element, preparing the buffer status report;
wherein the buffer status report is generated, based on each of the component carriers, to inform a radio node of an amount of data available for transmission in buffer of the user equipment;
wherein the buffer status report is prepared and transmitted without consideration of arrival of high priority data, periodic reporting, and occurrence of padding large enough to accommodate the signaling report;
transmitting the buffer status report to the radio node to be used by the radio node following the preparation of the buffer status report;
wherein the buffer status report is configured to provide information to the radio node to enable the radio node to determine a transport block size;
activating or deactivating at least one of the component carriers used by the user equipment with the control element; and
aggregating two or more of the activated component carriers in uplink and downlink in a common transmission time interval.

* * * * *